United States Patent [19]

Foster et al.

[11] Patent Number: 5,094,272

[45] Date of Patent: Mar. 10, 1992

[54] ADJUSTABLE ORIFICE PLATE SEAL

[76] Inventors: James H. Foster, 5050 Ambassador Way, No. 301, Houston, Tex. 77056; John Beson, 10938 Leaning Ash, Houston, Tex. 77079

[21] Appl. No.: 642,071

[22] Filed: Jan. 16, 1991

Related U.S. Application Data

[63] Continuation-in-part of Ser. No. 537,042, Jun. 11, 1990.

[51] Int. Cl.⁵ .............................. F15D 1/08; F15D 1/00
[52] U.S. Cl. .......................................... 138/44; 138/45
[58] Field of Search ....................... 138/44, 94.3, 94, 45

[56] References Cited

U.S. PATENT DOCUMENTS

| | | | |
|---|---|---|---|
| 1,575,259 | 3/1926 | Fisher | 138/44 |
| 1,822,961 | 9/1931 | Emery | 138/44 |
| 1,958,854 | 5/1934 | Kellett | 138/44 |
| 1,965,826 | 7/1934 | Daniel | 138/44 |
| 1,980,699 | 11/1934 | Robinson | 138/44 |
| 2,014,682 | 9/1935 | Greene | 138/44 |
| 2,217,216 | 10/1940 | Davis | 138/44 |

*Primary Examiner*—Harvey C. Hornsby
*Assistant Examiner*—Terrence R. Till
*Attorney, Agent, or Firm*—James F. Bradley

[57] ABSTRACT

A orifice fitting for measuring fluid flow in fluid pipelines has a seal mechanism to seal the orifice plate to the orifice fitting body. The orifice fitting has an orifice plate carrier which moves downward into a seat slot to position an orifice plate in the fluid flow. An annular seal mounts to the orifice plate assembly for engaging and sealing against the downstream side of the seat slot. A retaining ring mounts to an upstream side of the plate carrier. Threads on the retaining ring allow the ring to be adjusted to set the overall width of the plate carrier assembly to provide an interference fit in the seat slot. Set screws in the retaining ring bear against the orifice plate, which in turn bears against the seal member.

7 Claims, 2 Drawing Sheets

ADJUSTABLE ORIFICE PLATE SEAL

CROSS REFERENCE TO RELATED APPLICATION

This application is a continuation-in-part of application Ser. No. 537,042, filed June 11, 1990, "Energized Seal For Orifice Plate".

BACKGROUND OF THE INVENTION

1. Field of the Invention

This invention relates in general to orifice plate equipment for measuring fluid flow in pipelines, and in particular to a seal for sealing an orifice plate against the seat in an orifice fitting body.

2. Description of the Prior Art

One method of measuring fluid flow in pipelines is by the use of an orifice fitting. The orifice fitting is an assembly that will be mounted for receiving fluid flow. It has a body with a passage for the flow of the fluid. A gear mechanism will lower an orifice plate down into the fluid flow passages. The orifice plate has a hole through it. Fluid flow through the hole causes a pressure drop. The difference in pressure upstream and downstream of the plate is used to calculate the fluid flow volume.

A plate carrier carries the orifice plate. The orifice plate has a seal which seals on the downstream side of the orifice plate. The seal seals against an annular seat which surrounds the flow passages. It is important to have good sealing so as to obtain an accurate measurement of the pressure drop.

In the prior art, the seal is an oversized elastomeric ring surrounding the orifice plate. It compresses as the plate carrier forces it into a slot between the seats. The slot will have a lesser width than the width of the elastomeric seal ring surrounding the orifice plate.

A disadvantage of this technique is that the seal ring may be easily cut or damaged when forced into the seat slot if the protrusion of the seal is too great. Also, variations in face-to-face dimensions between the seats as well as corrosion and erosion of the seat areas often cause leaks past the seal ring. In larger orifice fittings, unsupported segments of the seat area will sometimes expand beyond the yield strength of material during pressure testing and will expand during normal operations. This causes a face-to-face dimension in this portion of the seat slot that is in excess of the allowable limits. This may result in leakage.

Because the leakage around the plate occurs only from an upstream to a downstream side of a plate, and not to the exterior of the fitting, it is difficult to detect. The seat slot dimension is affected by internal pressure and temperature, both inside and outside. The seat slot dimension in orifice fittings is critical in that leakage across the orifice plate-to-body seal causes significant error in measurement of fluid volume flowing through the orifice fitting.

SUMMARY OF THE INVENTION

In this invention, an annular seal member locates on a downstream side of the plate carrier and orifice plate assembly. The orifice plate locates within a mounting hole in the plate carrier. A retaining ring will mount in the mounting hole on the upstream side of the orifice plate. The mounting means for the retaining ring will allow the retaining ring to protrude in an upstream direction by adjustable amounts.

Prior to assembling the orifice plate in the plate carrier, the width of the seat slot in the flow passage will be measured under pressure. Then, the retaining ring will be adjusted so that the width from the downstream face of the seal member to the upstream side of the retaining ring will be slightly greater than the width of the slot.

In the preferred embodiment, the mounting means for the retaining ring comprises threads on the periphery of the retaining ring that mate with threads formed in the mounting hole. Rotating the retaining ring will thus adjust its protrusion from the plate carrier.

Also, preferably, set screws will be positioned around the circumference of the retaining ring to serve as holding means for holding the retaining ring in the desired position and to compress the orifice plate against the elastomeric seal. These set screws extend through and into contact with the orifice plate to prevent upstream movement of the orifice plate. Once the retaining ring has been positioned at the right distance, the set screws are tightened against the orifice plate. The orifice plate will seal against the elastomeric seal and force the elastomeric seal against the downstream seat to effect the final seal.

DETAILED DESCRIPTION OF THE INVENTION

Figure 1:
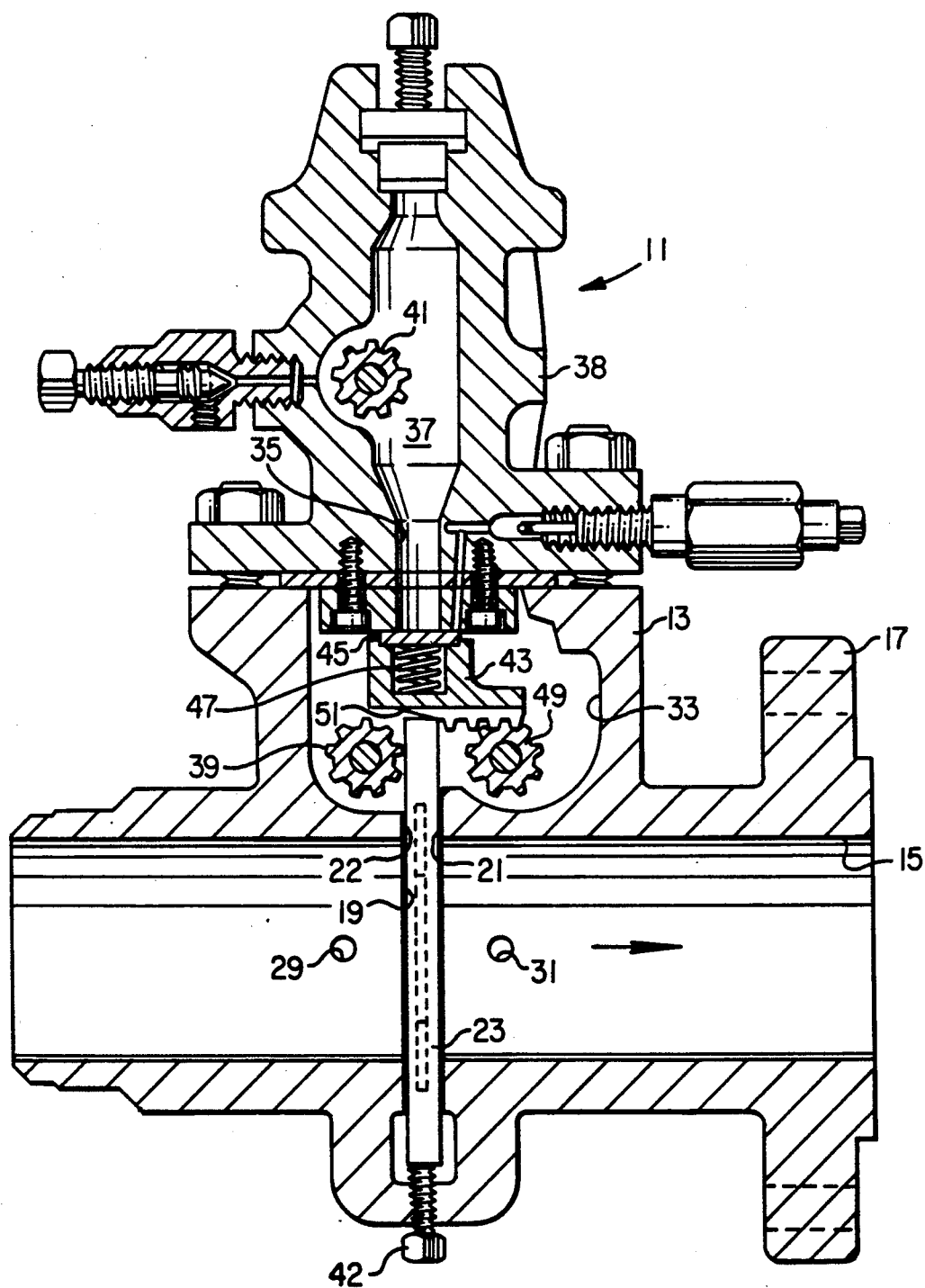
FIG. 1 is a vertical, partially schematic, view of an orifice fitting constructed in accordance with this invention.

Referring to FIG. 1, orifice fitting 11 is an assembly that includes a body 13. Body 13 has a flow passage 15 extending through it. Flange 17 will connect one side of the passage 15 to a pipeline. The other side of the passage 15 will also be connected to a pipeline. Fluid will flow through the flow passage 15 as indicated by the arrow.

A seat slot 19 locates in body 13 perpendicular to flow passage 15. The seat slot 19 has opposed annular seats 21. The seats 21 are flat smooth surfaces that are perpendicular to the flow passage 15 and face each other. A plate carrier 23 will locate in the seat slot 19 when in the active position shown in FIG. 1. Plate carrier 23 holds an orifice plate 25, shown in FIG. 2. Orifice plate 25 is a circular flat disk. It has a hole 27 along the central axis of the orifice plate 25.

Figure 2:
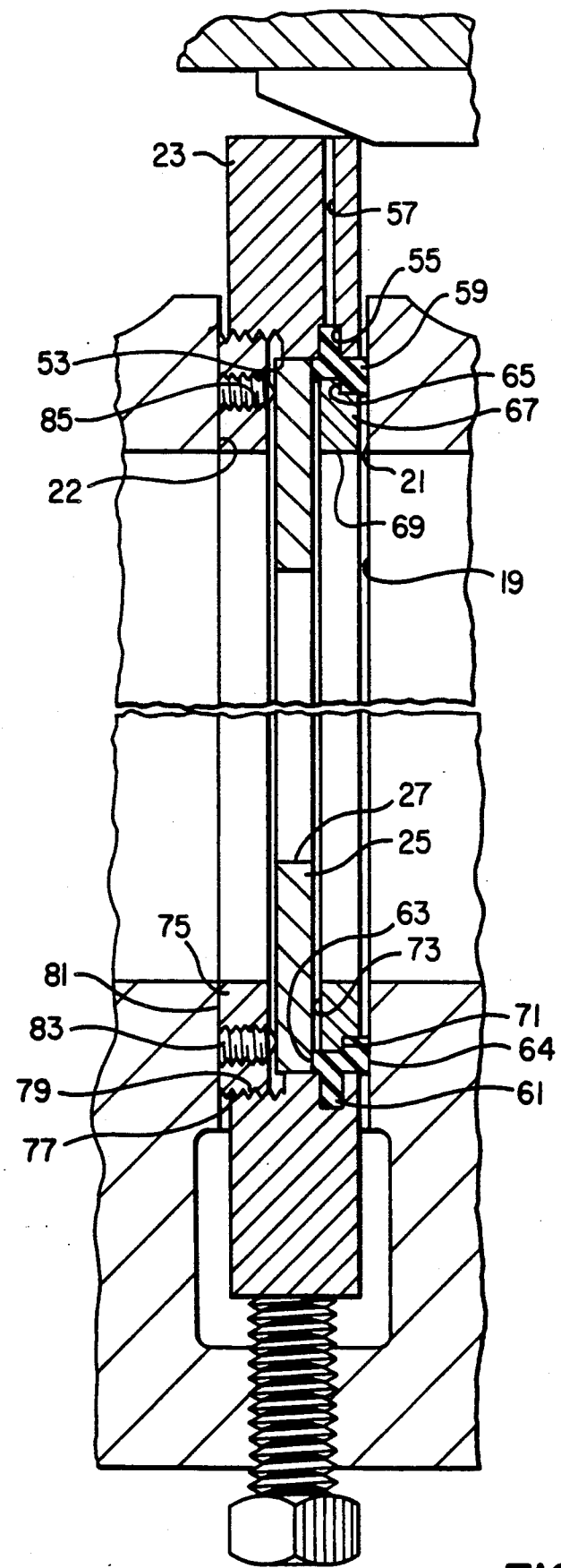
FIG. 2 is a partial enlarged vertical sectional view of the orifice fitting of FIG. 1.

Referring again to FIG. 1, ports 29 and 31 will be located in the flow passage 15 upstream and downstream of the plate 25. Measurement equipment (not shown) measures the pressure observed at the ports 29, 31 in order to determine the flow rate of the fluid flowing through the hole 27 in the orifice plate 25 (FIG. 2). This flow rate will be used to calculate the volume of fluid flowing through the flow passage 15.

Body 13 has a lower chamber 33 which locates above the flow passage 15. A slot 35 in the upper end of lower chamber 33 leads to an upper chamber 37. The upper chamber 37 is in an upper body section 38, which although a separate member, may be considered part of the body 13 for the purposes herein.

A gear 39 will connect to an external handle (not shown) for moving the plate carrier 23 vertically, perpendicular to the axis of the flow passage 15. Gear 39 engages teeth (not shown) formed on the edge of the plate carrier 23. Gear 41, located in the upper chamber 37, will also engage the plate carrier 23 when it moves upward sufficiently, to move the plate carrier 23 out of the top of the upper chamber 37. While in the upper chamber 37, the plate carrier 23 will be in an inactive position. A stop screw 42 in the bottom of body 13 serves as a stop for downward travel of plate carrier 23.

A slide valve carrier 43 will move a slide valve 45 across the slot 35. Slide valve 45 is urged upward by springs 47 to seal the lower chamber 33 from the upper chamber 37. A gear 49 moves the slide valve carrier 43 in a direction parallel with flow passage 15 and perpendicular to the direction of travel of the plate carrier 23. The slide valve carrier 43 will be in the closed position shown in FIG. 1 when the plate carrier 23 is in its active position shown in FIG. 1.

Gear 49 is attached to a shaft which will lead to an external handle (not shown). Gear 49 engages teeth on the slide valve carrier 43 to move it between the closed position shown in FIG. 1 and an open position (not shown) off to one side of the slots 19, 35. Slide valve carrier 43 has a cam plate 51 (FIG. 2) on the bottom which in the prior art would engage an upper edge of the plate carrier 23 to retain it in the lower or active position.

Referring to FIG. 2, plate carrier 23 has a circular mounting hole 53. When plate carrier 23 is in the active position, as shown in FIG. 2, the axis of the mounting hole 53 will be concentric with the axis of the flow passage 15. An annular recess 55 is formed in the wall of the mounting hole 53. Recess 55 is a counterbore located between the upstream and downstream sides of the mounting hole 53.

A plurality of fluid passages 57 extend radially (only one shown) from edges of the plate carrier 23 to the recess 55. Fluid passages 57 will be in communication with fluid from the upstream side of the flow passage 15.

A seal member 59 mounts in the mounting hole 53. Seal member 59 is an elastomeric ring. Seal member 59 has an annular locking flange 61 on its periphery. The locking flange 61 will fit snuggly within the recess 55. Seal member 59 has an upstream side 63 and a downstream face 64. The downstream face 64 is adapted to engage the seat 21. The upstream side 63 will contact the orifice plate 25. Seal member 59 also has an upstream shoulder 65 which is parallel with upstream side 63, but set back a short distance in a downstream direction. The upstream shoulder 65 is located on the inner diameter. Seal member 59 could alternately be an O-ring of conventional shape.

A metal support ring 67 fits within the inner diameter of seal member 59. Support ring 67 has an inner diameter 69 that is substantially the same diameter as the flow passage 15. Support ring 67 has a shoulder 71 on its downstream side. Shoulder 71 will contact the shoulder 65 of seal member 59. Support ring 67 also has an upstream side 73. The upstream side 73 is set back a slight distance from the upstream side 63 of the seal member 59 in a downstream direction. A clearance exists between the orifice plate 25 and the upstream side 73 of the support ring 67.

A retaining ring 75 mounts in the mounting hole 53 on the upstream side of the orifice plate 25. Retaining ring 75 has an inner diameter that is the same as the inner diameter of the flow passage 15. Retaining ring 75 has threads 77 on its outer diameter Threads 77 will engage threads 79 formed in the mounting hole 53 upstream from the orifice plate 25. Rotating the retaining ring 75 will screw it into and out of the threads 77 The retaining ring 75 has a thickness such that the upstream side 81 may protrude from the upstream side of the plate carrier 23. If the retaining ring 75 is tightened fully into the threads 77, its upstream side 81 will be substantially flush with the upstream side of the plate carrier 23.

A plurality of set screws 83 (only two shown) are spaced around the retaining ring 75. Each set screw 83 is located in a threaded aperture 85. The threaded apertures 85 are parallel to the axis of the flow passage 15. The set screws 83 will extend past the downstream side of the retaining ring 75 and contact the orifice plate 25. The contact of the set screws 83 will back up the orifice plate 25, preventing it from moving in an upstream direction when a force acting in an upstream direction is applied to the seal member 59.

In operation, initially, the operator should measure the axial width of the slot 19 when the orifice fitting 11 is under pressure. This can be done by utilizing a seat slot gage such as shown in pending application Ser. No. 537,021, filed June 12, 1990, entitled "Seat Slot Gage Tool". All of the material in that patent application is hereby incorporated by reference.

Once the width of the seal slot 19 is known, the operator will then adjust the axial width of the assembly of the plate carrier 23 to fit the seat slot 19. The operator will rotate the retaining ring 75 until it reaches the desired position. He will then rotate the set screws 83 until they contact the orifice plate 25.

The operator will measure the distance from the downstream face 64 of seal member 59 to the upstream side 81 of the retaining ring 75. For a proper fit, this distance should be greater than the axial width of seat slot 19 by a slight interference amount. The amount of interference should be approximately the same as used in the prior art, nonadjustable orifice plate assemblies. The threads 77 and 79 and set screws 83 serve as mounting means to allow the axial width of the plate carrier 23 to be adjusted to fit the axial width of seat slot 19.

Once adjusted, the operator will conventionally position the plate carrier 23 in the seat slot 19. This is handled by first installing the plate carrier 23 in the upper chamber 37 while the slide valve 45 closes the slot 35. Then, the slide valve 45 will be opened by the slide valve carrier 43 to equalize the pressure in the lower chamber 33 with the upper chamber 37. Then, the gears 41 and 39 will move the plate carrier 23 downward into the seat slot 19. The lower edge of the plate carrier 23 will contact the stop screw 42. The face 64 of seal member 59 will slide on the seat 21 and seal against the seat 21. The retaining ring 75 will slide on the upstream side 22 of slot 19. Because of the specified interference, the face 64 of the seal member 59 will deform slightly.

Then, the operator will rotate the gear 49 to move the slide valve carrier 43 to the closed position shown in FIG. 1. The cam plate 51 will tightly retain the plate carrier 23 in the active position Fluid will flow through the orifice plate hole 27. Measurement equipment will measure pressure at ports 29, 31 in order to determine the flow rate of the fluid. The upstream fluid pressure will pressurize the fluid passage 57 to the upstream pressure and enhance the elastomeric seal due to lower downstream pressure. This pressure will act against the seal member 59. It will more tightly push the seal member 59 against the seat 21.

The invention has significant advantages The retaining ring, set screw, and mounting means allow the width of the plate carrier assembly to be adjusted. Adjusting the width allows the desired amount of interference fit to be achieved. By first measuring the seat slot dimension at operating pressure, the adjustable orifice plate seal mechanism can then be customized or dimensionally set to assure a seal regardless of the seat slot dimension.

While the invention has been shown in only one of its forms, it should be apparent to those skilled in the art that it is not so limited, but is susceptible to various changes without departing from the scope of the invention.

We claim:

1. In an orifice fitting of the type having a body with a flow passage for connecting into a pipeline, an orifice plate seal seat located in a slot in the flow passage, a plate carrier which carries an orifice plate having a orifice for the passage of fluid, and gear means in the body for moving the plate carrier from an inactive position out of the flow passage to an active position in the slot in engagement with the seat and with the orifice plate in the flow passage, an improved means for sealing the orifice plate against the seat, comprising in combination:

the plate carrier having a mounting hole therethrough which has an axis, the orifice plate locating in the mounting hole with the orifice concentric with the axis;

an annular seal member located on a downstream side of the plate carrier and encircling the mounting hole, the seal member having a downstream face for engaging the seat;

a retaining ring located in the mounting hole, sandwiching the orifice plate between the retaining ring and the seal member;

mounting means for mounting the retaining ring to the plate carrier so that the retaining ring may protrude in an upstream direction from the plate carrier by an amount that may be adjusted to fit the axial width of the slot; and wherein the mounting means comprises:

a set of threads located in the mounting hole on an upstream side of the orifice plate;

a set of threads on the perimeter of the retaining ring which engages the threads in the mounting hole, so that rotating the retaining ring relative to the plate carrier will provide a selected protrusion of the retaining ring from the plate carrier; and a plurality of set screws located in threaded apertures spaced around the retaining ring and extending through the retaining ring into engagement with the orifice plate, so that rotating the set screws in one direction in the threaded apertures will cause the set screws to bear against the orifice plate.

2. In an orifice fitting of the type having a body with a flow passage for connecting into a pipeline, an orifice plate seal seat located in a slot in the flow passage, a plate carrier which carries an orifice plate having a orifice for the passage of fluid, and gear means in the body for moving the plate carrier from an inactive position out of the flow passage to an active position in the slot in engagement with the seat and with the orifice plate in the flow passage, an improved means for sealing the orifice plate against the seat, comprising in combination:

the plate carrier having a mounting hole therethrough which has an axis, the orifice plate locating in the mounting hole with the orifice concentric with the axis;

an annular seal member located on a downstream side of and in contact with the orifice plate, the seal member having a downstream face for engaging the seat;

a set of threads located in the mounting hole on an upstream side of the orifice plate;

a retaining ring having a set of threads on its perimeter which engages the threads in the mounting hole, sandwiching the orifice plate between the retaining ring and the seal member, the retaining ring capable of protruding in an upstream direction from the plate carrier; and a plurality of set screws located in threaded apertures spaced around the retaining ring and extending through the retaining ring into engagement with the orifice plate, so that rotating the retaining ring relative to the plate carrier to a selected protrusion from the plate carrier and then rotating the set screws in one direction in the threaded apertures into contact with the orifice plate will adjust the axial distance from the downstream face of the seal member to an upstream side of the retaining ring to fit the axial width of the slot.

3. The orifice fitting according to claim 2 further comprising passage means extending from the seal member through the plate carrier for transmitting fluid from an upstream portion of the flow passage to the seal member to assist in sealing the seal member to the seat.

4. The orifice fitting according to claim 2 wherein the seal member has an inner diameter and an upstream side and wherein a rigid support ring is located in the inner diameter of the seal member.

5. The orifice fitting according to claim 2 wherein the distance from the downstream face of the seal member to the upstream side of the retaining ring is slightly greater than the axial width of the slot.

6. In an orifice fitting of the type having a body with a flow passage for connecting into a pipeline, an orifice plate seal seat located in a slot in the flow passage, a plate carrier which carries an orifice plate having a orifice for the passage of fluid, and gear means in the body for moving the plate carrier from an inactive position out of the flow passage to an active position in the slot in engagement with the seat and with the orifice plate in the flow passage, an improved means for sealing the orifice plate against the seat, comprising in combination:

the plate carrier having a mounting hole therethrough which has an axis, the orifice plate locating in the mounting hole with the orifice concentric with the axis;

an annular seal member located on a downstream side of the orifice plate, the seal member having a downstream face for engaging the seat and an upstream side with a portion in contact with the orifice plate, the seal member having an inner diameter;

a metal support ring located in and engaging the inner diameter of the seal member;

a set of threads located in the mounting hole on an upstream side of the orifice plate;

a retaining ring having a set of threads on its perimeter which engages the threads in the mounting hole, sandwiching the orifice plate between the retaining ring and the seal member, the retaining ring capable of protruding in an upstream direction from the plate carrier; and a plurality of set screws located in threaded apertures spaced around the retaining ring and extending through the retaining ring into engagement with the orifice plate, so that rotating the retaining ring relative to the plate carrier to a selected protrusion from the plate carrier and then rotating the set screws in one direction in the threaded apertures into contact with the orifice plate will adjust the axial distance from the downstream face of the seal member to an upstream side of the retaining ring to be slightly greater than the axial width of the slot.

7. The orifice fitting according to claim 6 further comprising passage means extending from the seal member through the plate carrier for transmitting fluid from an upstream portion of the flow passage to the seal member to assist in sealing the seal member to the seat.

* * * * *